April 28, 1953 P. P. PREVOST 2,636,205
RECEPTACLE SUPPORTED STATIONARY
REST AND WIPER FOR MILK CANS
Filed March 10, 1950
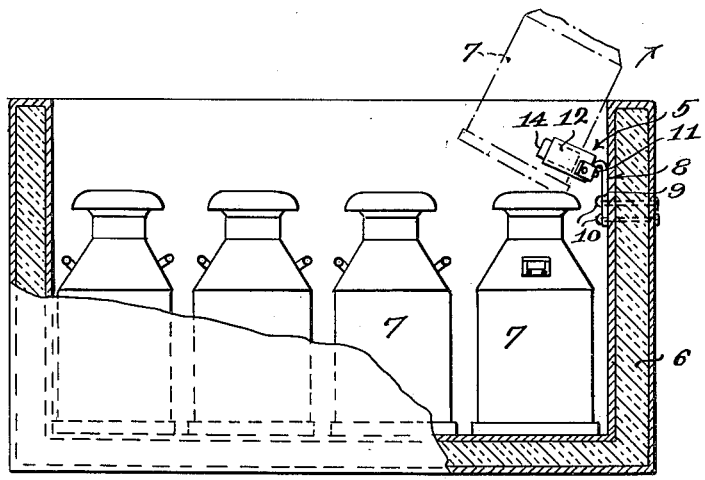
Fig. 1.
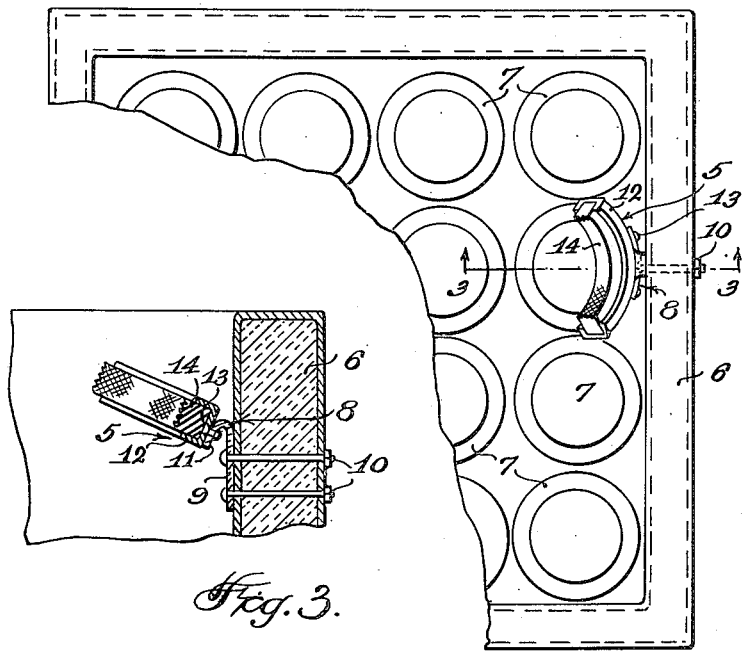
Fig. 2.
Fig. 3.
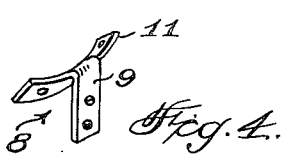
Fig. 4.
Inventor
Perry Philip Prevost
By John N. Randolph
Attorney Patented Apr. 28, 1953

2,636,205

UNITED STATES PATENT OFFICE 2,636,205

RECEPTACLE SUPPORTED STATIONARY REST AND WIPER FOR MILK CANS

Perry Philip Prevost, Attica, N. Y.

Application March 10, 1950, Serial No. 148,840

3 Claims. (Cl. 15—210)

This invention relates to a milk can wiping attachment for use with ice boxes, water vats or other large receptacles employed for holding large cans of milk and for maintaining the milk in a chilled condition.

It is customary to store milk in ice boxes or water cooling vats in large milk cans, usually of ten gallon capacity, until the milk is ready to be shipped from the dairy farm to the diary. Either due to water in the vat or due to condensation, the exterior of such milk cans is usually in a very wet condition and as a result in manually lifting the cans from the vat or receptacle and in carrying the can to a point to be loaded on the truck, the water from the can wets the front of the clothing of the person handling the can so that after thus handling a few cans of milk the front of the clothing of the handler is soaking wet.

Accordingly, it is a primary object of the present invention to overcome this undesirable result occurring from the normal handling of milk cans and to additionally provide means which will afford a fulcrum for the can being removed from an ice box or vat to minimize the actual lifting force required to accomplish the removal of the can while at the same time wiping and drying approximately a longitudinal half of the can which is nearest the handler so that when said can portion is held against the body it will be dry and will not wet the clothing.

Still a further object of the invention is to provide a can wiping device of extremely simple construction which may be very economically manufactured and sold and which may be quickly and easily mounted in either a water vat, ice box or other open top receptacle used for storing cans in a chilled condition.

Various other objects and advantages of the invention will hereinafter become more fully apparent from the following description of the drawing, illustrating a presently preferred embodiment thereof, and wherein:

Figure 1 is a vertical sectional view of an open top cooling vat or ice box and showing the can wiper in end elevation mounted therein;

Figure 2 is a fragmentary plan view of the vat or box showing the can wiper disposed therein;

Figure 3 is an enlarged vertical sectional view taken substantially along a plane as indicated by the line 3—3 of Figure 2, and Figure 4 is a perspective view of the wiper supporting bracket.

Referring more specifically to the drawing, for the purpose of illustrating a preferred application and use of the milk can wiper, designated generally 5 and comprising the invention, a conventional type of storage vat or open top receptacle is shown at 6 and which is adapted to contain a plurality of large milk cans 7 which are normally of a ten gallon capacity and which are maintained in a chilled condition in the vat 6 by ice or a liquid cooling medium, not shown, so as to prevent souring of the milk with which the cans 7 are filled and while the cans are temporarily thus stored until being shipped to a dairy. In removing the cans 7 from the vat 6 and in transporting them ordinarily a short distance to be loaded on a truck, it is customary and necessary to lift the cans by hand out of the open top of the vat 6 and to manually carry the can to a point to be loaded on a truck. When thus manually carrying the can, part of the can rests against the front of the body of the carrier or handler and the water or condensation on the outer side of the can wets and very quickly soaks the front of the clothing of the handler.

The can wiper 5 provides a device of extremely simple construction which may be quickly and easily mounted in a water vat, ice box or other storage receptacle for milk cans and by means of which approximately one longitudinal half of each can is wiped as it is withdrawn from the receptacle so that the wiped side of the can will be disposed adjacent the body of the handler to thus eliminate the undesirable result of wetting the clothing. Additionally, the can wiper functions as a fulcrum for the can as it is removed from the receptacle thus lessening the actual physical force required to lift the can out of the receptacle. The can wiper 5 includes a supporting bracket, designated generally 8 including a bar portion 9 which is disposed against the inner side of one wall of the vat 6 and which is secured thereto by suitable fastenings 10. The bracket 8 also includes an elongated plate 11 which extends transversely of the bar 9 and which is bowed throughout its length. The plate 11 has an upper edge, the intermediate portion of which is formed integral with the upper end of the bar 9 and said plate 11 is disposed at acute angle to the bar 9 and at an oblique angle to the adjacent wall of the vat, so as to extend downwardly and inwardly of the vat 6, with respect to said bar 9, as illustrated in Figures 1 and 3. The side of the plate 11 remote to the bar 9 constitutes the concave side thereof and is adapted to bear against the outer, convex side of a longitudinally bowed channel member 12 which defines a segment less than one-half of a circle and which is secured to the intermediate portion of the plate 11 by a plurality of fastenings 13. The channel-shaped side of the channel member 12, which likewise constitutes its concave side, opens inwardly and upwardly with respect to the vat 6 and contains a relatively thick strip 14 of a wiping material such as rubber which extends from end-to-end of the channel member 12 and which is clamped therein and protrudes from the open, concave side of said channel member 12. If desired, the wiping element 14 may extend slightly beyond the ends of the channel member 12.

The bracket 8 is mounted on one of the walls of the vat 6 so that the channel member 12 and wiping element 14 are disposed above the level of the tops of the cans 7 yet beneath the level of the open top of the vat 6 so that if the receptacle 5 constitutes an ice box having a cover, the can wiper 5 will not interfere with or contact the cover, not shown, when in an applied position. Likewise, the can wiper 5 is disposed sufficiently above the cans 7 so as not to interfere with the filling of the vat 6 with the cans 7 or the removal of the cans therefrom.

It will be readily apparent that the right-hand can 7 as illustrated in Figure 1 and which is disposed directly beneath the wiper 5 may be initially grasped by its handles and lifted upwardly and slightly away from the wiper 5. As said can 7 is elevated toward its dotted line position of Figure 1 the wiping element 14 will contact the upper portion of the side wall of the can and said can 7 may then be drawn upwardly at an incline as illustrated in dotted lines in Figure 1 and with the lower portion of the can supported by sliding engagement with the wiping element 14. In this manner, a longitudinal portion of the side wall constituting less than one-half of the can is slid transversely across the wiping element 14 so that when said portion of the can wall has cleared the wiping element 14, all moisture will have been wiped therefrom. After the can has cleared the wiping element 14 it is lifted over the rim of the vat 6 and is then carried to a point to be loaded on a truck. In carrying the can 7, after removal from the vat 6, the side of the can which has been wiped by the wiping element 14 will be disposed next to the body of the handler so as to prevent wetting of the clothing. It will be readily apparent that the other cans 7 may thereafter be removed in a similar manner from the vat 6 after first being displaced to a position substantially beneath the wiper 5. It will also be apparent that the wiper 5 in addition to wiping a portion of the can also functions as a fulcrum for the can and supports a substantial part of the weight thereof as the can is elevated at an incline as illustrated in dotted lines in Figure 1 thereby materially reducing the manual effort required to remove milk cans from a vat or receptacle since without the wiper 5 each can would have to be lifted vertically until it was at a sufficient height to slide along a portion of the rim of the vat.

Various modifications and changes are contemplated and may obviously be resorted to, without departing from the spirit or scope of the invention as hereinafter defined by the appended claims.

I claim as my invention:

1. A milk can wiper comprising a bracket adapted to be secured to the inner side of one wall of a vat having a free end disposed at an oblique angle to the vat wall, an elongated channel member secured intermediate its ends to the free end of the bracket and supported thereby to open inwardly and upwardly with respect to the vat, said channel member being longitudinally bowed from end to end thereof and defining a segment less than one half of a circle and having an inner concave side opening away from the bracket, and a wiping element comprising an elongated strip clamped in the channel member and having a portion projecting from its inner concave side and extending from end-to-end thereof including a concavely arced inwardly and upwardly facing can engaging wiping surface, said channel member and wiping element being adapted to be supported by the bracket below an open top of the vat and above the level of milk cans contained within the vat whereby the cans in being removed from the vat will slide over the wiping surface for wiping one side of each can and for partially supporting the weight of each can during removal thereof from the vat.

2. A can wiper as in claim 1, said channel member and wiping element being curved to substantially conform to the curvature of the wall of a milk can.

3. A can wiper as in claim 1, said bracket comprising an elongated longitudinally bowed plate defining the free end thereof disposed against and secured to the outer, convex side of the channel member and a bar extending downwardly from the upper edge and intermediate portion of said plate at an acute angle thereto and which is adapted to be disposed against and secured to the inner side of the vat wall.

PERRY PHILIP PREVOST.

References Cited in the file of this patent

UNITED STATES PATENTS

| Number | Name | Date |
|---|---|---|
| 564,831 | Mylacraine | July 28, 1896 |
| 617,397 | Hoyt | Jan. 10, 1899 |
| 728,754 | Park | May 19, 1903 |
| 1,164,156 | Yeager | Dec. 14, 1915 |
| 1,795,606 | Kamstad | Mar. 10, 1931 |
| 2,196,837 | Rader | Apr. 9, 1940 |
| 2,241,947 | Goodwin | May 13, 1941 |
| 2,401,961 | Rappl | June 11, 1946 |
| 2,536,215 | Povondra | Jan. 2, 1951 |
| 2,537,411 | Klinger | Jan. 9, 1951 |